(12) United States Patent
Rueben et al.

(10) Patent No.: US 8,209,308 B2
(45) Date of Patent: Jun. 26, 2012

(54) METHOD FOR PRESENTATION OF REVISIONS OF AN ELECTRONIC DOCUMENT

(76) Inventors: Steven L. Rueben, Las Vegas, NV (US); Gabriel Jakobson, Las Vegas, NV (US)

( * ) Notice: Subject to any disclaimer, the term of this patent is extended or adjusted under 35 U.S.C. 154(b) by 1416 days.

(21) Appl. No.: 11/415,757

(22) Filed: May 1, 2006

(65) Prior Publication Data

US 2007/0260996 A1 Nov. 8, 2007

(51) Int. Cl.
*G06F 7/00* (2006.01)
*G06F 17/30* (2006.01)

(52) U.S. Cl. .................................................. 707/705

(58) Field of Classification Search .................. 707/705, 707/999.203
See application file for complete search history.

(56) References Cited

U.S. PATENT DOCUMENTS

| | | | |
|---|---|---|---|
| 5,353,391 A * | 10/1994 | Cohen et al. ................... | 345/619 |
| 6,177,933 B1 | 1/2001 | Young | |
| 6,332,150 B1 | 12/2001 | Khan | |
| 6,360,236 B1 | 3/2002 | Khan | |
| 6,698,013 B1 | 2/2004 | Bertero | |
| 6,904,561 B1 * | 6/2005 | Faraday et al. ............... | 715/202 |
| 6,928,425 B2 | 8/2005 | Grefenstette | |
| 6,963,858 B2 | 11/2005 | Wang | |
| 6,963,920 B1 | 11/2005 | Hohmann | |
| 6,970,881 B1 | 11/2005 | Mohan | |
| 2004/0093564 A1 * | 5/2004 | Kumhyr et al. ............... | 715/526 |
| 2005/0138540 A1 * | 6/2005 | Baltus et al. .................. | 715/511 |

* cited by examiner

*Primary Examiner* — Aleksandr Kerzhner

(57) ABSTRACT

A method and apparatus for displaying the evolution of an electronic document (e.g. word-processing document, portable-document-format file, spreadsheet, drawing, and the like), containing tracked changes, is disclosed. In accordance with the disclosed method and apparatus, the revisions of an electronic document may be treated as parent frames. In between the parent frames, child frames may be constructed from the combined images of their parent frames. To form a child frame, an image of a parent frame has a degree of translucency as it is combined with the translucent image of the other parent frame, such that every child frame contains traces of the images of both its parent frames. An input device (e.g. keyboard, mouse, touchpad, stylus, voice activation, and the like) may be used to control the frame visible to the user at any one time. The user may use the input device to traverse the frames at various speeds and in either direction, creating the visual illusion that a certain revision of the document is being morphed into its future revisions—or stripped off its changes as it is morphed into previous revisions—depending on the direction chosen by the user.

14 Claims, 7 Drawing Sheets

METHOD FOR PRESENTATION OF REVISIONS OF AN ELECTRONIC DOCUMENT

FIELD OF INVENTION

The present invention relates to document creation and management systems. More particularly, the present invention relates to the visual presentation of revisions of electronic documents, and in particular to a method of presenting revisions of an electronic document as a series of translucent, overlapping layers, whereby a user can traverse the layers, watching the document transform from its original state to its final version, as each revision of the document morphs smoothly into the next.

BACKGROUND OF THE INVENTION

Collaboration on documents is prevalent in both the workplace and at home. A person creating an electronic document often shares the document with other people, who may make changes, add comments and/or make suggestions (collectively, revisions, unless otherwise noted), before returning the document, in a marked-up form, to the original author. Electronic documents are accessed and manipulated by computer applications, such as Microsoft Word™, Corel WordPerfect™ and Adobe Acrobat™ or over the internet by services such as Writely™. Applications designed to access and manipulate electronic documents often contain functionality to capture and display the revisions made by different users. Such revisions are usually displayed in different colors—with each color denoting a different user—and lines which lead to side comments on the nature of the revision and the user who made them. Revisions made by a user are often treated as suggestions, which another user may choose to accept or reject. An acceptance or rejection does not usually eliminate the original revision visually. To the Contrary, acceptance or rejection of a revision often adds more graphics to the display of the revised document to show that a revision had been made by a certain user, and either accepted or rejected by another user. Thus, with every revision cycle where a user edits a document, the number of lines and colors that are added to the document in the form of markups may increase substantially. The resulting display of a revised document may easily confuse or overwhelm a person reviewing the revised document, which, after having been edited by a small number of users, may contain more colors and lines denoting revisions than actual content.

Conventional electronic document applications lack a sense of time and evolution in displaying revised documents. Humans are "wired" to view events in a chronological order, where they can follow a story board. When various users make changes to a document, they often follow a certain train of thought. One person's changes may be in response to a previous person's suggestions, which in turn, may be in response to another user's comments, and so forth. This chronology is often lost when all revisions are "collapsed" into a single document. Even though each user's additions, subtractions, approvals, rejections and comments may be noted in different colors, the presentation of so many changes at once may leave the reader unable to discern who-added-what-when-and-in-response-to-what. Some conventional electronic document applications allow the reader to choose to display a revised document in various discrete views. One view may be the original document before any revisions were made. Another view may the document in its final form, once all revisions have been approved or rejected. Another view may be the original document with all successive revisions before acceptance or rejection. Another view may be the changes done by one particular user. While being able to view a document in these various views is beneficial, it comes very short of giving a user a good sense for the chronology of changes and evolution of the revisions. For example, one word in a document may have been inserted by one user, rejected by another user who then substituted a different word in its place—a change that was rejected by another user who preferred to insert the original word back. The original author would look at the revised document and see their original word, but it would be surrounded by markings, such as colorful lines and side comments with the names of other users and actions they had taken. Such a display lacks a visual representation of the chronology of the changes made to the original document and a visual representation of the evolution of the document as it progressed from one user to the next.

DESCRIPTION OF THE DRAWINGS

For a more complete understanding of the present invention and further advantages thereof, references are now made to the following Detailed Description, taken in conjunction with the drawings, in which.

SUMMARY OF THE INVENTION

A method for allowing a user to track changes in revisions of a document by treating each revision as a layer, superimposed on other revisions-treated-as-layers, with varying degrees of translucency among the layers. Additional intermediate layers are created from the existing layers and inserted between them, so as to smoothen the visual transition from one layer to the next. The visual effect for the user is being able to "go forward and backwards in time", by seeing an evolution-like presentation of all revisions of the document, smoothly morphing one into the other—either in forward or reverse motion. The user sees how the document evolved from its original form to its final form in a movie-like presentation. The user may reverse the direction in which the layers, or frames, are displayed, so as to get a sense of "going back in time" and seeing the document being smoothly stripped of all its changes, in reverse order to how the changes had been made, and going back to its original form. The user has granular control over the speed with which each frame morphs into the next and the direction of transformation. A user can pause or stop at any particular frame. One of the many advantages of the present invention is in the user's ability to absorb and digest the changes made to a document over time, faster and with less effort, than in reviewing a document-undergone-changes in a conventional application, such as a word processor, not operating according to the principles of this invention.

DETAILED DESCRIPTION

Figure 1:
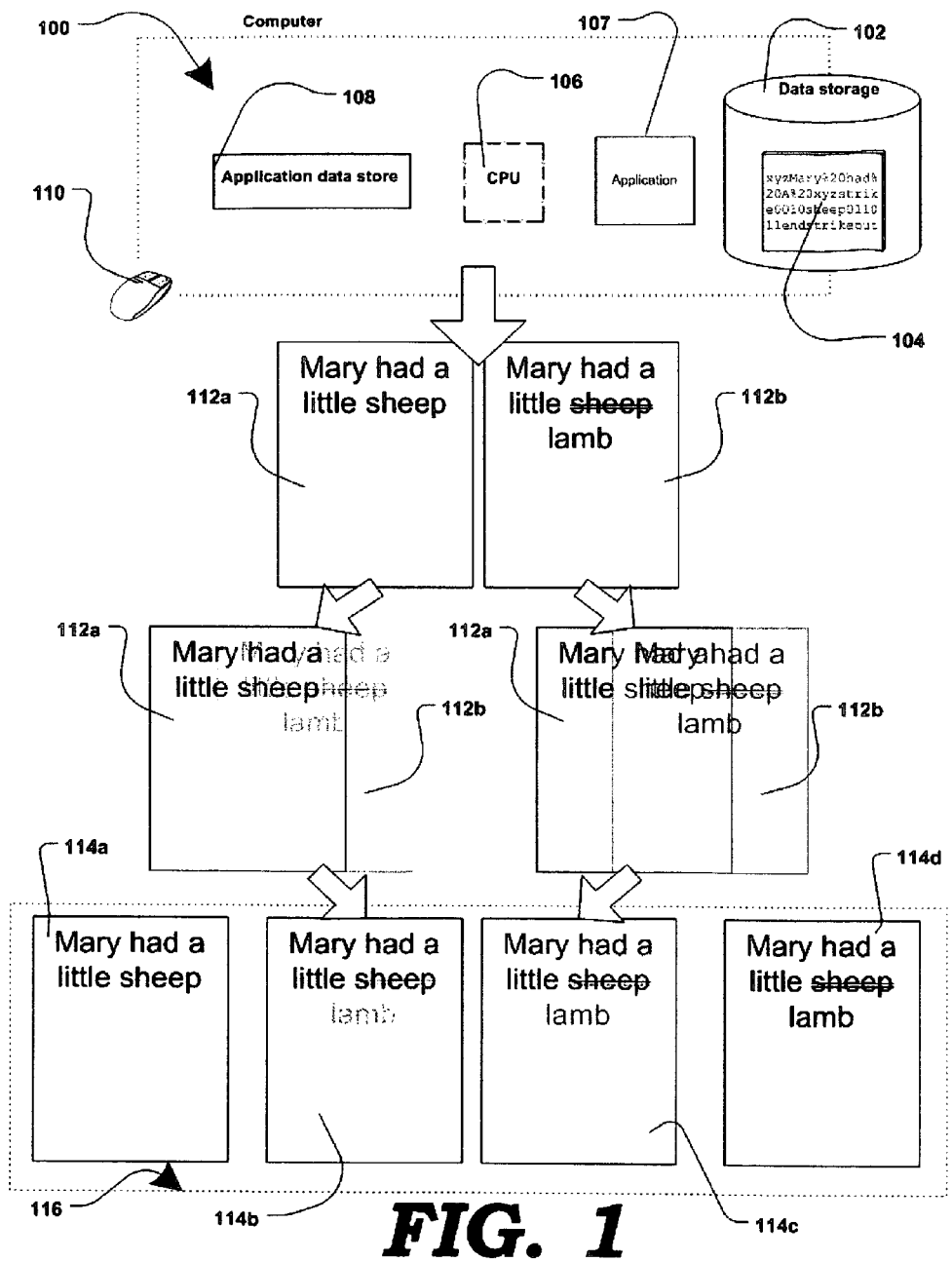
FIG. 1 is a diagram of the general system architecture allowing for changes in revisions of a document to be presented as a series of overlapping, translucent layers.

FIG. 1 illustrates a diagram of the general system architecture of one embodiment of a system allowing a user to track changes throughout revisions of a document by viewing the revised version of the document as a series of translucent, superimposed layers. In one embodiment of the invention, a computer 100 has access to a document file 104 (which may be a Microsoft Word® .doc file, an Adobe® .pdf file, etc) stored on a storage device 102, which is either part of computer 100 or is accessible to computer 100 over a network. The content of the document file 104 is typically a machine-readable format which an application 107 (eg. Microsoft Word®, Adobe Acrobat®) can present to a user as a human-readable document 112a which may contain text, graphics, embedded objects, etc. Document 104 may also contain various changes made by one or more users to the original document 112a. An application 107 residing in computer 100, capable of reading document file 104 and processing it with one or more central processing units 106, can present to a user on display 116 either the original document 112a or what that document looks like with changes 112b. Documents may be created, modified, viewed or managed by applications of various types and categories: Microsoft Word®, Microsoft OneNote®, StarOffice®, OpenOffice®, Microsoft Visio®, Microsoft excel®, Macromedia Dreamweaver®, Adobe Acrobat®, etc. of document 104, displaying to the user the document in its original form 112a or Many conventional document creation, editing and viewing applications, including word processors, ("document creation applications" unless otherwise noted) provide the ability to track changes and compare different documents. Additionally, document management applications such as Microsoft Word®, Microsoft OneNote®, StarOffice®, OpenOffice®, Microsoft Visio®, Microsoft excel®, Macromedia Dreamweaver®, Adobe Acrobat®, etc. (as well as other document management applications) provide the ability to store, track and compare documents. Conventional document creation applications and document management applications enable a user to use an input device 110 to toggle between discrete revisions revised form 112b. Unless otherwise noted, "document applications" includes any application capable of accessing a document file 104, which would include both document creation applications and document management applications, as well as other types of applications. The present invention allows an application 107 capable of processing the document file 104 to utilize a central processing unit 106 and the application data store 100 to merge the visual representations 112a and 112b of the document file 104 in application data store 108, so that new child frames 114b and 114c are formed in application data store 108. Frame 114b represents a graphical super-imposition of layer 112b on top of layer 112a, such that both layers are perfectly overlapping, and setting the transparency factor of layer 112b to a high number, greater than 50% and less than 100%, so that frame 114b would visually appear as mostly 112a with some traces of 112b. Child frame 114c is constructed as a similar merging of layers 112a and 112b, with the transparency factor of 112b being a smaller number, smaller than 50% and larger than 0%, such that a user would see mostly layer 112b with traces of layer 112a. Frame 114a shows layer 112a unchanged, and frame 114d shows layer 112b unchanged. Frames 114a, 114b, 114c and 114d are visible to a user on display device 116 accessible to computer 100, such that only one of the aforementioned frames is visible at one time (in the presently preferred embodiment), and a user can use input device 110 (eg. Keyboard, mouse, etc) to control the frame which is visible on display device 116. A user could start with frame 114a visible and use an input device 110 to scroll in one direction, traversing frames 114b, 114c and 114d, in that order; or, command the input device to reverse directions and traverse the frames in reverse order, 114d, 114c, 114b and 114a.

It should be appreciated that only two child frames, 114b and 114c, are illustrated here for the sake of simplicity. In a preferred embodiment of this invention, the number of child frames between two original frames such as 114a and 114d could be double that or more. In addition, a document like 104 may contain more revisions than the one 112b in this illustration. In this manner the present invention allows the total number of frames within which a document's evolution to be displayed may be in the dozens of frames, or more.

Figure 2:
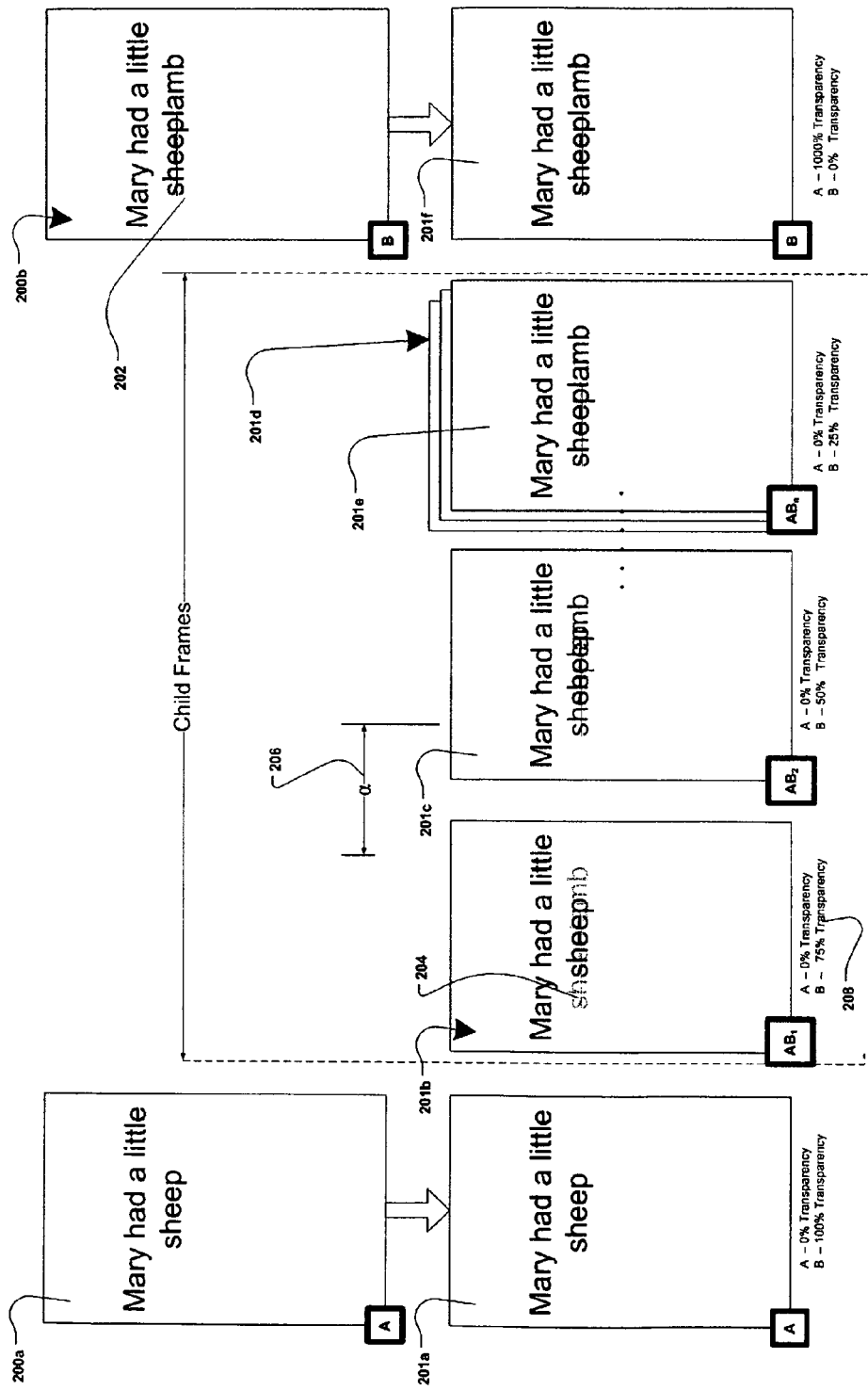
FIG. 2 is a diagram illustrating the creation of child frames from parent frames to allow for a smooth transition among revisions, according to one embodiment of the present invention.

FIG. 2 illustrates the conversion of two revisions of a document, A 200a and B 200b—treated as layers in this discussion—into a series of frames, A 201a, $AB_1$ 201b, $AB_2$ 201c . . . $AB_n$ 201e and B 201f. The change between any two original revisions—or parent frames—of a document, eg. A 200a and B 200b, may be used to create a new series of child frames, $AB_1$ 201b, $AB_2$ 201c . . . $AB_n$ 201e, whereby child frames in the series comprise layer B 200b, with a certain degree of transparency 208, superimposed graphically on layer A 201a, which, in the presently preferred embodiment, is opaque, such that both layers are visible to varying degrees. Within the series $AB_1$ 201b, $AB_n$ 201e, the transparency factor of layer B 200b decreases as the frames are traversed 1→n. As the frames are traversed from A 201a to B 201b, they are constructed such that: in frame A 201a, layer B 200b is substantially transparent; in frame $AB_1$ 201b, B 200b is mostly transparent and B 200b decreases in transparency until the last frame, B 202f, where frame A 200a has the least transparency of all of the frames. This process may be repeated between the next pair of original revisions-turned-parent-frames for the rest of the document.

The number of child frames, $AB_1$ 201b . . . $AB_n$ 201e, varies and depends on the frame transparency factor a 206, which defines the difference in the transparency factor between any two child frames. Collection of child frames 201d illustrates the fact that there may be a few additional child frames within the range $AB_1$ 201b . . . $AB_n$ 201e, not explicitly shown here, as n is a variable whose derivation is explained below. If, as an example, a 206 is a number such as 20%, then the transparency factor of layer B 200b decreases by 20% with each successive child frame, as 1→n. In one preferred embodiment, dividing 100% by a 206 would yield n, which is the number of child frames. For example, if a 206 is 20%, then 100%/20%=5 providing 5 child frames. However, alternate embodiments of the present invention may use a transparency factor a 206 that is not constant, or equal, between child frames but rather vary in some fashion so as to provide a better visual transition among frames. Accordingly, a 206 denotes that the transparency factor of the B 200b component in each child frame decreases with each successive frame as 1→n, regardless of whether the change in the transparency factor is a constant or variable.

Figure 3:
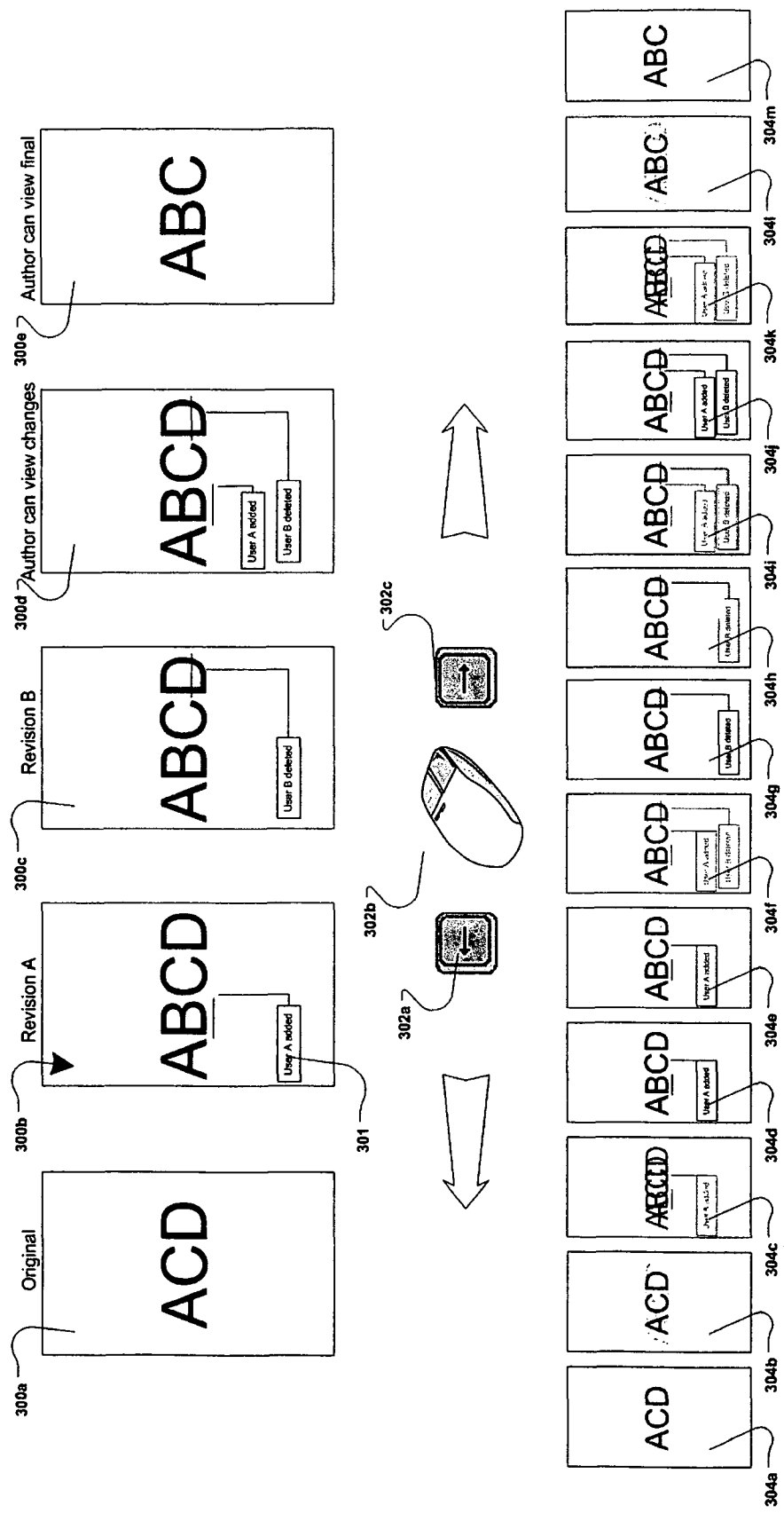
FIG. 3 is a diagram illustrating how an evolution of a document with multiple revisions can be presented and manipulated according to one embodiment of the present invention.

FIG. 3 illustrates evolution of a document and how that evolution would be presented by a system operating in accordance with the present invention. Document snapshots 300a-300e exemplify the various ways in which an existing application enabled for tracking changes, such as Microsoft Word®, would show a document, which has gone through two revisions. An original document created by a first user 300a with the letters "ACD" in it is shared with a second user. The second user inserts the letter "B" into the shared document. This change in the document is then presented as Revision A 300b. An existing application enabled for tracking changes, such as Microsoft Word®, may insert a comment 301 on the page, denoting the revision and the user who made it, in addition to the actual revision made by the user. Additionally, in the present example, a third user has made another revision to this document, saved as Revision B 300c, where that user deleted the letter "D". When the original author (the first user) opens this document file, an application such as Microsoft Word® would let them choose a view between seeing all other user changes and comments on document 300d, or seeing the final appearance of document 300e, with the letter "B" added, "D" omitted and all user-modification comments such as 301, invisible.

In one embodiments of the present invention, the five phases of original document 300a are mapped into parent frames in memory accessible to the client device: 300a becomes 304a, 300b becomes 304d, 300c becomes 304g, 300d becomes 304j, and 300e becomes 304m. A series of child frames—304b, 304c, 304e, 304f, 304h, 304i, 304k and 304l—is then created. Frame 304b is constructed by superimposing snapshot 300b, times a transparency factor of greater than 50%, on top of snapshot 300a, such that 300b is visible as a ghostly image on top of a clear 300a. Frame 304c is constructed by superimposing snapshot 300b, times a transparency factor of less than 50%, on top of snapshot 300a, such that 300b is visible more clearly on top of 300a. Every other pair of child frames, such as 304e and 304f, are constructed in a similar fashion by the parent frames they are derived from, in this example, 304d and 304g. The result is a series of frames, 304a-304m, that illustrates the entire transition of original document 300a into its final form 300e.

A user would then use an input device accessible to the client device, such keys on a keyboard 302c or mouse 302b, to manipulate the sequence and speed with which frames 304a-304m are shown. For example, let us assume frame 304a—which is the original document 300a, is displayed on a display device accessible to the client device on which this application is running. A user can slide mouse 302b to the right, and the see the sequence of frames 304b, 304c, 304d . . . displayed in that order, with a small time delay between them. Because each such frame is displayed entirely overlapping the previous frame, the user does not sense the presence of individual frames, but rather experiences the illusion the document is morphing from one phase to the next, in an animated fashion. By reversing the direction of input device 302b or 302c, the order in which frames 304a-304m are shown is reversed, so as to give the user a sense of "going back in time" and seeing the document being smoothly stripped of all its changes, in reverse order to how the changes were made, and go back to its original form 300a.

Figure 4:
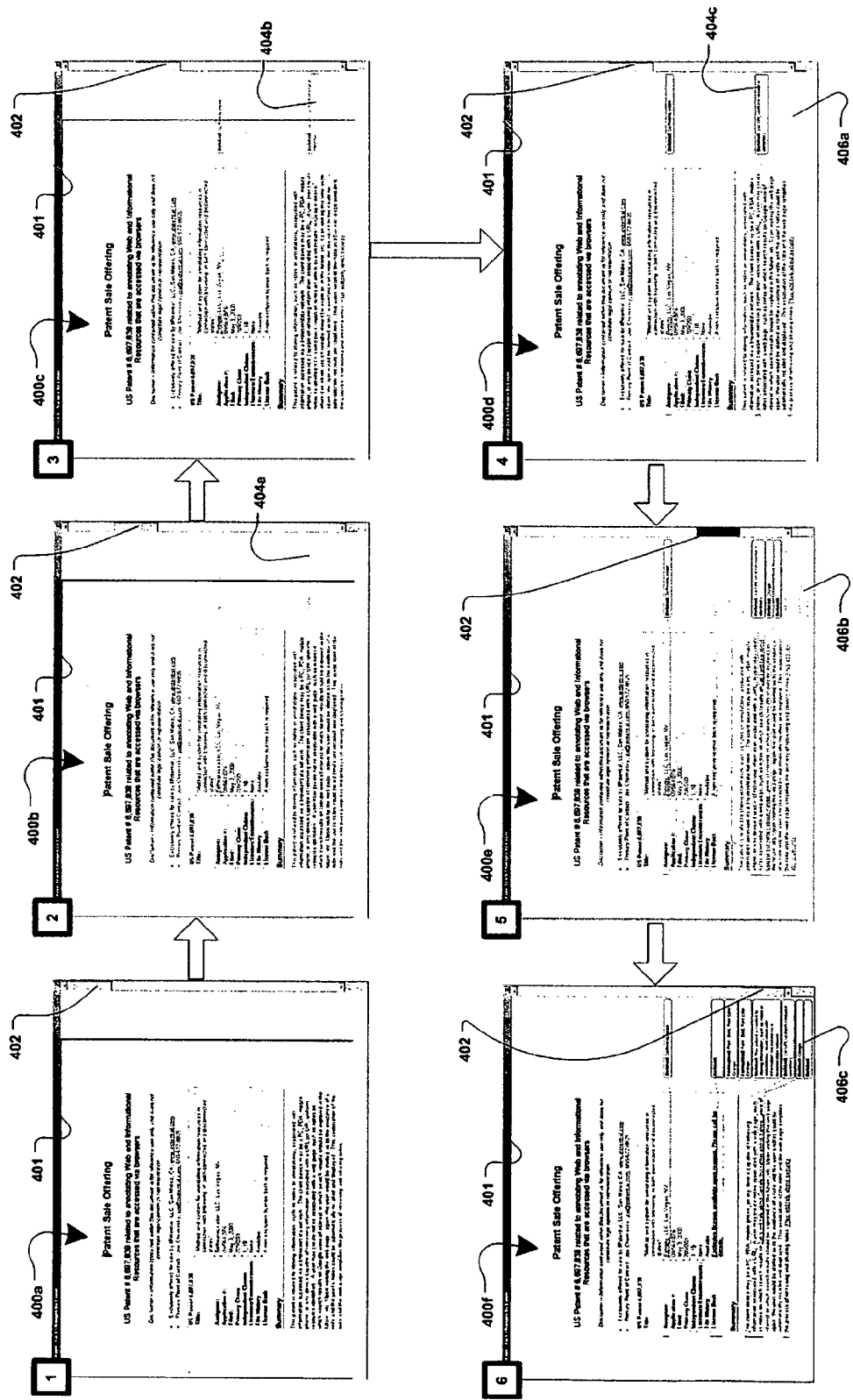
FIG. 4 is a series of simulated screenshots showing the presentation of an evolving document in a container functioning in accordance with one embodiment of the present invention.

FIG. 4 illustrates a sample sequence of screenshots of an application 401, presenting visual representations of a document 400a-400f, operating according to the principles of this invention. Inspecting the screenshots clock-wise, from 1 to 6, the reader will notice scrollbar 402 sliding within container 401. The user may control the position, direction and speed-of-slide of scrollbar 402 with any input device accessible to the client device (eg. Keyboard, mouse, touchpad, stylus pen, voice, etc. . . . ). Alternatively, the position direction and speed-of-slide may be controlled by other graphical controls, or by input from the keyboard or other peripheral devices (for example, using the arrow keys or other keys to control progression through the various views of the document). Document-representation 400a is replaced with document-representation 400b within the application's display 401, as scrollbar 402 slides down one notch (or by other controls). The document-representation 400b containing a "ghostly image", i.e. a transparent view, of what would eventually become—as scrollbar 402 slides down a notch to present document-representation 400c and then another notch to present document-presentation 400d—comment 404c which is shown in full focus, color and clarity in document-representation 400d. Document-representation 400c shows comment 404b, which is a less prominent representation of comment 404c, but is more prominent than 404a. As the user scrolls down via scrollbar 402, the application presents representations 400d, 400e and 400f, where another subsequent presentations of image 406a, becomes more prominent and sharper in document-representation 400e as compared to document-representation 406b, and then comes into full focus, color and clarity as image 406c in document-representation 400f. Document-representation is similar to the visual representation of an edited document provided by conventional document creation and management applications. In this manner the example embodiment shown in FIG. 4 is able to provide representations of the original and final versions of a document, while also providing views of the progression of changes not provided in conventional document creation and management systems. While the example embodiment shown in FIG. 4 includes six select screenshots of the document transformation are shown in this illustration for the sake of simplicity. Alternate embodiments may have more or fewer screenshots. For example, a document which has been modified many times, by many users, may have dozens of screenshots or more.

The merits of this invention may be further appreciated when considering a typical workflow in document creation and revision. The author of the original document 400a may send the document file to their colleagues to revise. The original author receives the document back after revisions have been made and it often looks like 400f—full of annotations, colors, comments, deletions, additions and suggestions. Typically most, if not all, of the markings in 400f were made by different people at different times. With conventional document creation and management applications, the reader would find it daunting to follow the logic of each person making changes, and separate it from the logic of other people making corrections or changes (at an unknown time with respect to the first user making changes). By contrast, the reader may then imagine their word processor behaving in the fashion proposed by this invention, allowing them to scroll "forward and backwards in time", seeing each user's changes materializing as the document evolves to its final form; or, going "back in time" and starting with final document-representation 400f and seeing all user changes smoothly "peeling away" until the document takes its original form 400a.

Figure 5:
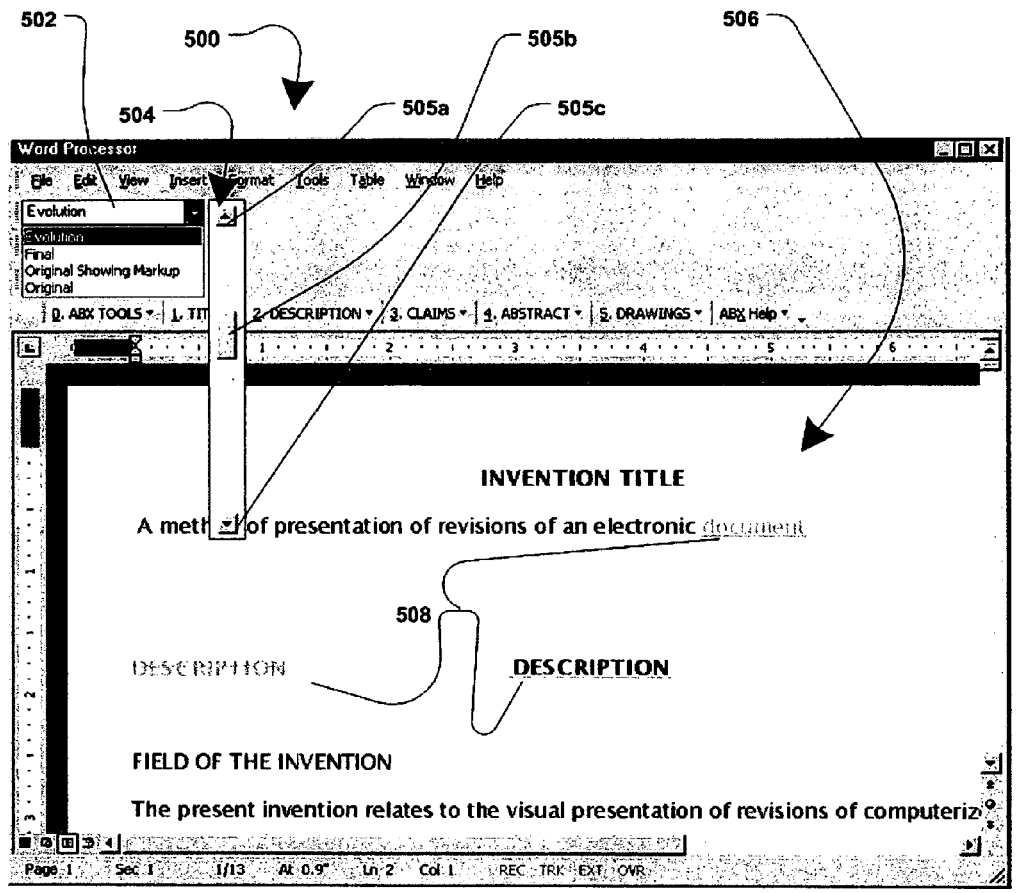
FIG. 5 is an illustrative screenshot of a document application operating according to one embodiment of the present invention.

FIG. 5 illustrates a preferred embodiment of this invention within a computer application acting as a document application 500. Document application 500 may contain a dropdown menu 502 which allows a user to select the revision of document 506 the user chooses to display. One of the items in menu 502 may be labeled "Evolution", or other such designation, and would allow the user to use a scrollbar 504 to control the revision of the document 506 currently visible to the user. While the scrollbar 504 is shown in a position located near the drop down menu 502, alternate embodiments may place the scroll bar 504 in other positions in relation to the menu 502 or document window, and may be oriented such that the scrolling motion is vertical, as shown, horizontal, or at an angle to the horizontal or vertical axes. In one possible alternative embodiment, the top position 505*a* of scrollbar 504 may signify a prior version of the document before certain edits have been made, for example the original form of document 506 before any edits have been made. The bottom position 505*c* of scrollbar 504 may represent a later version of the document after certain edits have been made, such as the final revision of document 506, after all changes have been accepted (or after all changes have been made). The vertical position of thumb 505*b* within scrollbar 504, represents (or corresponds to) the revision, or frame, of document 506 the user is observing through application 500. By using a pointing device (eg. Keyboard, mouse, stylus, trackball, voice, etc) the user may control the vertical position of thumb 505*b*, and slide it upwards toward the top 505*a*, or down toward the bottom 505*c*. For example, in one preferred embodiment sliding the thumb 505*b* in an upward direction would rewind the revisions, or frames, of the document 506 visible to the user, such that the user would see revisions of document 506 rolling back toward the original form of the document. Correspondingly in the same example, sliding thumb 505*b* in a downward motion, would cause the visible document 306 to morph into newer revisions of itself, until the final form of document 506 is displayed, when thumb 505*b* is at the bottom position 505*c* of scrollbar 504. In another preferred embodiment of the present invention, scrollbar 504 may correlate to the entire document 506 in such manner that the number of positions in which thumb 505*b* can be placed within the trough of scrollbar 504, corresponds to the number of revisions of document 506. When a user drags thumb 505*b* into a position in scrollbar 504, the revision of document 506 displayed may be the same ordinal revision—out of n revisions—as the ordinal position of thumb 505*b* out of n positions. For example, if there were 50 revisions, or parent frames, of document 506, scrollbar 504 may have 50 positions for thumb 505*b* within its trough. If the user were to drag thumb 505*b* half-way through the trough of scrollbar 504 (I.e. position 25), the twenty-fifth revision of document 506 may display.

In order to present the transformation of one revision to the next in a smooth, animation-like fashion to the user, child frames are generated between parent frames (the frames which correspond to the original revisions). A child frame is constructed by combining the images of both its parent frames, with each parent frame having a degree of translucency. The resulting visual effect, as the user slides bar 505*b* up or down, is the revisions of the document morphing one into the other. As one revision morphs into the next, its appearance fades away 508.

Figure 6:
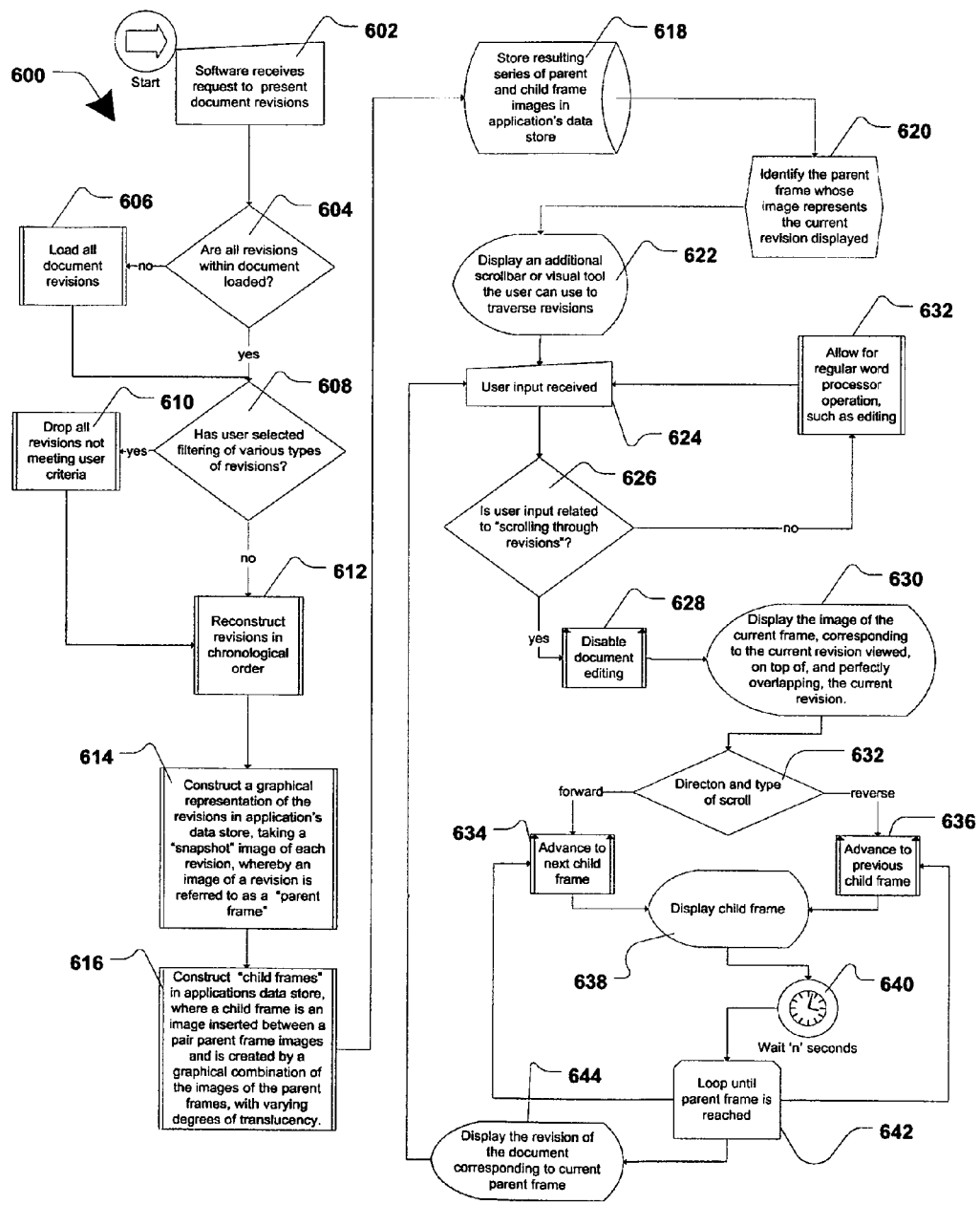
FIG. 6 is a flowchart of a method enabling a document application to allow a user to scroll through document revisions, according to one embodiment of the present invention.

Referring to FIG. 6, a flowchart 600 of a method enabling a document application to allow a user to view document revisions, according to one embodiment of the present invention, is shown. The document application receives input 602 from the user requesting to view document revisions, such as a request to view a slideshow revision history. Step 604 checks to see if the requested document and revisions, is loaded (in the preferred embodiment, revisions are included within a document, but may be included in a secondary file or may be determined by comparing two or more documents). If it is not, Step 606 loads the requested document. Step 608 determines whether the user had chosen to filter out revisions based on criteria, and Step 610 filters out all revisions not meeting the criteria. For example, a user may want to see only the revisions made by one author or a subset of the authors, as opposed to all revisions made by all authors. In the presently preferred embodiment, step 612 reconstructs the revisions fitting the criteria in chronological order. In the presently preferred embodiment of this invention, reconstruction step 612 starts with the original document and progresses chronologically to the final revision of the document—where a revision constitutes any change (e.g. insertion, deletion, comment, format, etc) to a document bearing a timestamp and information on the author making the change. In another possible embodiment, a revision would constitute all changes made to a document by an individual author in a timeframe that is chronologically between the times other authors made other changes to the document. In still another possible embodiment, a revision may constitute certain types of changes to a document. For example, a revision may only constitute insertion and deletion, but not include formatting changes (or not include most formatting changes, while including significant formatting changes involving multiple words or lines of the document). In one possible embodiment, step 614 renders each revision in the application's data store, as it would appear in the form of a document to the user, and takes a snapshot into the application's data store. The result is an image, such as a bitmap, in the application's data store of the way each revision would appear to the user. Each such snapshot is referred to as "parent frame". Step 616 creates "child frames". In one preferred embodiment the child frame is a bitmap image created by the graphical combination of a pair of parent frames, with each parent frame having a certain degree of translucency. Multiple child frames can be created from a pair of parent frames and are inserted between the parent frames they were each derived from, in the application's date store. Alternate embodiments of the present invention may use vector drawings or a combination of raster, vector and or bitmap images to create the child frames. In one preferred embodiment step 618 stores the resulting sequence of images in the application's data store, in an order such as: parent1, child1, child2 . . . childn, parent2, child1 . . . . Step 620 maps the revision currently displayed to the user to the appropriate parent frame, such that the parent frame identified in this process, is an exact image of the revision the user is currently viewing. Step 622 then displays a graphical means by which the user could scroll through revisions, such as a scrollbar, a forward backward control, or other such graphical controls.

Steps 624 through 644 describe the general operation of a document application as the functionality claimed in this invention is invoked within the document application. Step 624 receives used input of any type: keystrokes, pointing device movement, and the like. Step 626 determines whether the input in Step 624 was related to the display of revision history. For example, did the user slide the scroll bar displayed in Step 622? If the input is determined to be unrelated to display of the revision history—for example the user hit a key not associated with a command to the display of revision history, Step 632 may treat the input as a regular instruction to the document application, and the corresponding functionality of the document application is invoked. If Step 626 determines the input in Step 624 was related to the display of revision history, Step 628 is invoked to suspend document application functionality. In the presently preferred embodiment, step 630 displays the parent frame identified in Step 620 such that it overlays the "real" document the user is viewing perfectly (the "real" document being the document loaded into the viewing window of the document application), in a manner which provides the user with an image substantially similar to the real document. Step 632 determines whether the user's input in Step 624 had intended to scroll "forward" or "backward" through revisions. In response to scrolling forward, Step 634 is executed where the next child frame, following the parent frame displayed in Step 630, is selected for display. Upon scrolling backwards, Step 636 is executed, selecting the child frame preceding the parent frame displayed in Step 630, as next to be executed. The sequence of steps 634/636 through 642 form a loop to traverse all child frames until the next parent frame is reached. In the presently preferred embodiment, step 638 displays the child frame image selected in Steps 634 or 636, such that it overlaps the previous frame in such a manner as to give the user a visual illusion that the document has morphed. Step 640 may create a timed delay (preferably <1 second) to let the user's eye absorb the change in frames. Step 642 loops back to Steps 634 or 636—depending on the direction of the scroll determined in Step 632, until all child frames have been traversed and a parent frame is reached as the next to be displayed. Loop 634/6 through 642 is exited and the revision of the document corresponding to the parent frame reached in steps 634/6, is displayed in Step 644. (the visual effect produced is an animation which shows the parent frame in Step 630—representing the current revision—morph smoothly into a new revision, shown in step 644) Step 624 is then invoked again, awaiting new user input. In the preferred embodiment of the present invention, Step 632 may capture the type of scroll the user is performing, in addition to the direction of scroll. The type of scroll refers to the option of performing a scroll by a "small amount" or a "large amount." An example of scroll inputs indicating a small amount is, with a traditional scrollbar, clicking the arrows at the top and bottom of the scrollbar. Examples of scroll inputs indicating a large amount include, in a traditional scrollbar, dragging the thumb through the trough or clicking the trough above or below the thumb, or using jump arrow keys indicating multiple frames should be skipped. In response to the user's choosing to scroll forward or backwards by a large amount, Steps 634 and 636 may be instructed to advance forward or backwards, respectively, by multiple frames. For example, a user scrolling forward by a large amount in Step 632, may cause Step 634 to advance to the next child frame of the next parent frame, skipping all child frames of the present parent frame. This may allow a user to scroll forward and backwards faster, bypassing intermediate revisions.

In yet another embodiment, the sequence of frames presented to the user may be presented sequentially by receiving a "play" indication from the user, for example by the user selecting a play button, or the sequence may auto-play the sequence of frames when a user selects to view revisions.

While the above embodiment describes display of revision history from parent frame approximating the state of revisions of an original document, alternate embodiments may present a parent frame which includes one or more revisions, which may include some or all of the revisions of the final version of the revised document. Additionally, alternate embodiments may present one or more child frames independent of the parent frames, allowing display of intermediate revision information without the display of one or both, of the final and original versions of the document.

Figure 7:
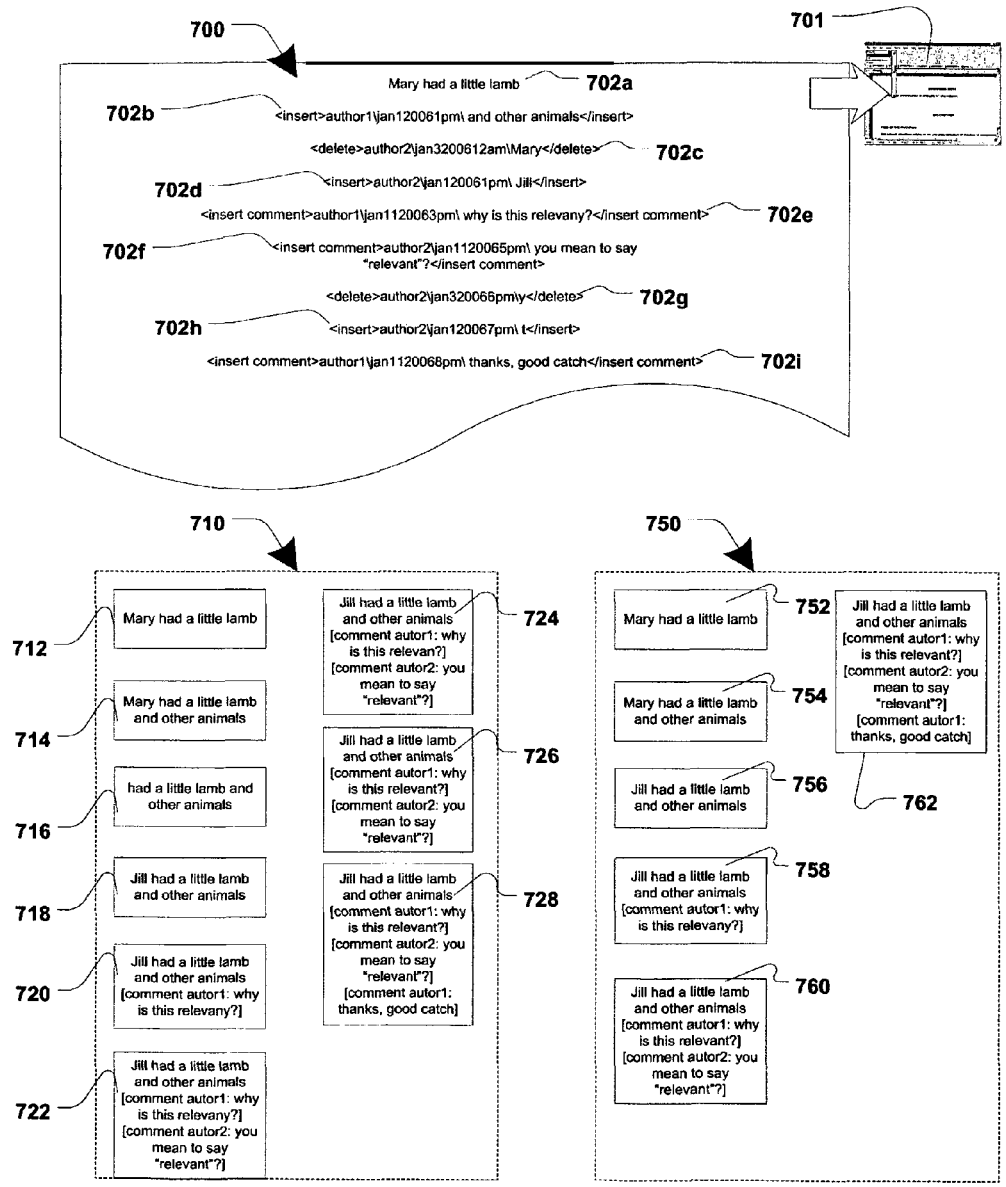
FIG. 7 is a diagram illustrating how revisions may be derived, according to various embodiments of the present invention.

FIG. 7 is a diagram illustrating how revisions may be derived, according to further embodiments of the present invention. Document 700 illustrates how a file of a document creation application 701 (e.g. Microsoft Word®, Adobe Acrobat®, WordPerfect®, etc.) may store content and user modifications (e.g. proprietary binary ".doc" file used by Microsoft Word® or ".docx", ".xlsx", ".pptx" used by the Microsoft Office Open XML Formats, etc.) File document 700 contains both data 702a to be presented to the user, and meta data 702b-702i which provides document creation application 701 (in the present example, Microsoft Word®) with additional information and instructions for the data to be displayed. "Mary had a little lamb" 702a is content, or data, contained in document 700. Data 702a-702i is representative of text that a user would see by opening document 700 with a document creation application 701. Text data 702a may be any form of data, such as text, graphics, OLE (Object Linking Embedding) object, URL (uniform resource locator) link, etc, which document creation application 701 is capable of processing. Modifications that authors make to a document via document creation application 701 are captured in data file 700 in the form of both meta, and actual data 702b-702i. An author may add the text "and other animals" via document creation application 701, which may write to application file 700 both the actual data the author added, "and other animals", and meta data with additional information on this modification, such as the author's name "author1", date-and-time-stamp "Jan. 1 2006 1 pm" and type of modification "insert" 702b. Additional changes made by authors may be captured in a similar fashion 702c-702i, with the type of modification (insert/delete/comment, etc), date-and-time-stamp and author name captured in document file 700, for every modification made.

In the presently preferred embodiment, revisions 710 including captured modifications 702a-702i may become an individual "parent frame" 712-728, presented in the chronological order in which the modifications had occurred, and were date-and-time-stamped. Data text 702a may become parent frame 712. Insertion 702b, which bears the earliest timestamp, may become parent frame 714. Deletion 702c, which bears the second-earliest timestamp, may become parent frame 716. The next parent frames may be formed in a similar manner. Insertion 702d may become parent frame 718. Comment insertion 702e may become parent frame 720. Comment insertion 702f may become parent frame 722. Deletion 702g may become parent frame 724. Insertion 702h may become parent frame 728. Comment insertion 702i may become parent frame 728. A distinct benefit to this presently preferred embodiment-turning every recorded modification 702a-702i into a parent frame—is in allowing the user to focus on a single change per parent frame when reviewing parent frames. However, alternate embodiments may include more than one revision in a parent frame. Additionally, alternative embodiments may omit one or more captured modifications from a parent frame.

In addition, in another embodiment of the present invention, the document may be automatically positioned in such a way that as a new revision is loaded, the page within the document where a change had taken place according to that revision, is automatically scrolled into the user's view. For example, if page 5 of a 30 page document is currently in view, and the user advances to the next parent frame—in which a modification happened on page 19—the document creation application operating in accordance with the present invention may scroll the document automatically in such a way that page 19 may become visible. (saving the user from having to scroll down 14 pages to look for the single change in the new revision loaded)

In yet another embodiment, parent frames 750 are formed such that multiple modifications made by an individual author, which are captured in document file 700 with date-and-time-stamps succeeding modifications made by a previous author, and preceding modifications made by another author, may be grouped together to form a single parent frame. Original text 702a may become the first parent frame

752. Insertion 702*b* made by author1, based on its date-and-time-stamp which precedes other modifications 702*c*-702*i* and association with author1, may be included in the second parent frame 754. Deletion 702*c* and insertion 702*d* are the next chronological modifications; they may be combined— because they were both made by the same author, "author2"—in parent frame 756. Next, chronologically, is comment insertion 702*e*, which may form its own parent frame 758, as it is the one modification made by "author1" and nestled between modifications made by "author2". The next three modifications 702*f*, 702*g* and 702*h* may be grouped together to form parent frame 760, as they are all made by "author2". Last is modification 702*i*, which alone may form parent frame 762, as it is the last chronological modification to have been made, and had been made by "author1", following a series of modifications 702*f*-702*h* made by "author2". In this example embodiment a smaller number of parent frames may be created, which may require less user time and effort to traverse all revisions, and may be more economical in terms of system resources. As this example embodiment illustrates, multiple changes to a document may be included in a single parent frame. Further, this example illustrates one possible embodiment where the parent frame includes all prior changes presented as original text, and changes by one given author as revisions. Alternate embodiments may display all revisions by all authors included in the parent frame as original text, or changes by prior authors may either be omitted, or displayed as changes and visually distinct (through transparency, color, font, etc.) from the changes of the author associated with the parent frame.

In yet another embodiment, the user may instruct the document application 701, to alternate between the embodiments above, such that on some occasions every modification may create its own parent frame, whereas on other occasions, multiple modifications made by the same author—nestled between modifications made by other authors—may be grouped together to form a single frame. Further embodiments of the present invention may create parent frames based on a host of other criteria and other permutations, allowing multiple modifications sharing a common attribute or attributes, or having an attribute or attributes falling within a range (or ranges) of attributes to be included within a single parent frame.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of claims are intended to be embraced therein.

What is claimed is:

1. A method of displaying an animation sequence from revisions of an electronic document, comprising:
   retrieving revision history information from the electronic document;
   selecting a first revision point corresponding to a given point of time during the revision history of the electronic document;
   selecting a second revision point corresponding to a given point of time during the revision history of the electronic document which is later in time than the first revision point;
   creating an initial parent frame image associated with the first revision point, the parent frame image including revisions made prior to the first revision point;
   creating a final parent frame image associated with the second revision point, the parent frame image including revisions made prior to the second revision point and after the first revision point;
   creating a plurality of child frame images between the initial parent frame and the final parent frame, wherein the child frame images include:
   at least one revision from the initial parent frame at a first transparency factor, and
   at least one revision from the final parent fame at a second transparency factor, wherein the transparency factors are varied between the plurality of child frames;
   presenting the plurality of child frame as the animation sequence, wherein document editing is disabled for the duration of the animation sequence.

2. The method of claim 1, wherein the sequence of transparency factors is varied from the first child frame to the last child frame to reduce the transparency of document revisions that delete document information from the initial parent frame and to reduce the transparency of document revisions that add document information appearing in the final parent frame, wherein the first child frame corresponds to a point in time prior to the last child frame in the sequence of child frames.

3. The method of claim 1, further comprising:
   receiving a revision display request from a computer application,
   retrieving the document history revision information for a document loaded within the computer application.

4. The method of claim 3, wherein the presentation of the sequence of child frames is within the computer application.

5. The method of claim 3, further comprising:
   receiving input from a graphical control indicating a request to advance the sequence of child frames in time from the initial parent frame to the final parent frame.

6. The method of claim 5, further comprising:
   receiving input from a graphical control indicating proceeding backwards in time of child frames from the final parent frame to the initial parent frame.

7. The method of claim 1, further including:
   receiving a user input requesting displaying the animation sequence;
   suspending user edits of the electronic document;
   presenting the animation sequence; and
   un-suspending the user edits of the electronic document.

8. The method of claim 1, wherein the transparency factor a varies between child frames according to the relationship:
   a 1/n where n is the number of child frames in the plurality of child frames.

9. The method of claim 1, wherein the pair of initial revision frame image and final revision frame image are among additional pairs of revision frame images, and wherein the final revision frame image of one pair of revision frame images may be the initial revision frame image of a different pair of revision frame images.

10. The method of claim 9, wherein the pairs of parent frame images are chosen such as to provide an approximate initial state and final state of revisions made by a user between receiving and modifying the electronic document and allowing another user to receive and modify the electronic document.

11. A computer-implemented system for allowing a user to view evolution of an electronic document including changes to the electronic document that were made over time, comprising:

means for retrieving and displaying the electronic document;

means for retrieving revision information associated with the electronic document;

means for selecting a first revision point corresponding to a given point of time during the revision history of the electronic document;

means for selecting a second revision point corresponding to a given point of time during the revision history of the electronic document which is later in time than the first revision point;

means for creating an initial parent frame image associated with the first revision point, wherein the parent frame image includes revisions made prior to the first revision point;

means for creating a final parent frame image associated with the second revision point, wherein the parent frame image includes revisions made prior to the second revision point and after the first revision point;

means for creating a plurality of child frame images between the initial parent frame and the final parent frame, wherein the child frame images include:
        at least one revision from the initial parent frame at a first transparency factor, and
        at least one revision from the final parent fame at a second transparency factor, wherein the transparency factors are varied between the plurality of child frames;

means for presenting the plurality of revision frames as an animated sequence: and means for suspending editing-related user input from affecting the electronic document.

12. The system of claim 11, wherein wherein the editing-related user input is suspended during the presentation of the animation sequence.

13. The system of claim 11, wherein the user has control over the manner in which the plurality of revision frames are created and presented.

14. The system of claim 13, wherein an IO device controls a graphical control including a scroll bar, and wherein manipulation of the scroll bar advances or retards the sequence of the revision frames.

\* \* \* \* \*